United States Patent [19]

Congdon

[11] Patent Number: 5,036,573

[45] Date of Patent: Aug. 6, 1991

[54] HOLLAND FIFTH WHEEL CYLINDER REMOVAL TOOL

[76] Inventor: Thomas E. Congdon, 7504 Austin Dr., Apt. A, Chattanooga, Tenn. 37416

[21] Appl. No.: 439,146

[22] Filed: Nov. 20, 1989

[51] Int. Cl.$^5$ ............................................. B23P 19/04
[52] U.S. Cl. ..................................... 29/252; 254/10.5; 29/227
[58] Field of Search ............... 29/227, 239, 252, 452; 254/10.5, 93 R

[56] References Cited

U.S. PATENT DOCUMENTS

| | | | |
|---|---|---|---|
| 1,139,488 | 5/1915 | Christopher | 29/252 |
| 1,351,424 | 8/1920 | Jenkins | 29/252 |
| 1,753,888 | 4/1930 | Holsen | 29/252 |
| 1,889,965 | 12/1932 | Kendall | 29/252 |

*Primary Examiner*—J. J. Hartman
*Attorney, Agent, or Firm*—Leon Gilden

[57] ABSTRACT

A Holland cylinder removal tool is set forth for use in removing a fifth wheel cylinder from an associated fifth wheel mount. The tool includes a plurality of spaced parallel and aligned arms, each extending from a respective fluid cylinder end and a piston of the fluid cylinder wherein the arms are extensible and retractable with respect to one another and are each formed with a "U" shaped jaw at a terminal end of each arm for securement adjacent a spring assembly associated with a pneumatic cylinder of the Holland fifth wheel mount to compress the springs and enable removal of the associated pins connecting the air cylinder to the cores aligned with the air cylinder within the springs.

1 Claim, 1 Drawing Sheet

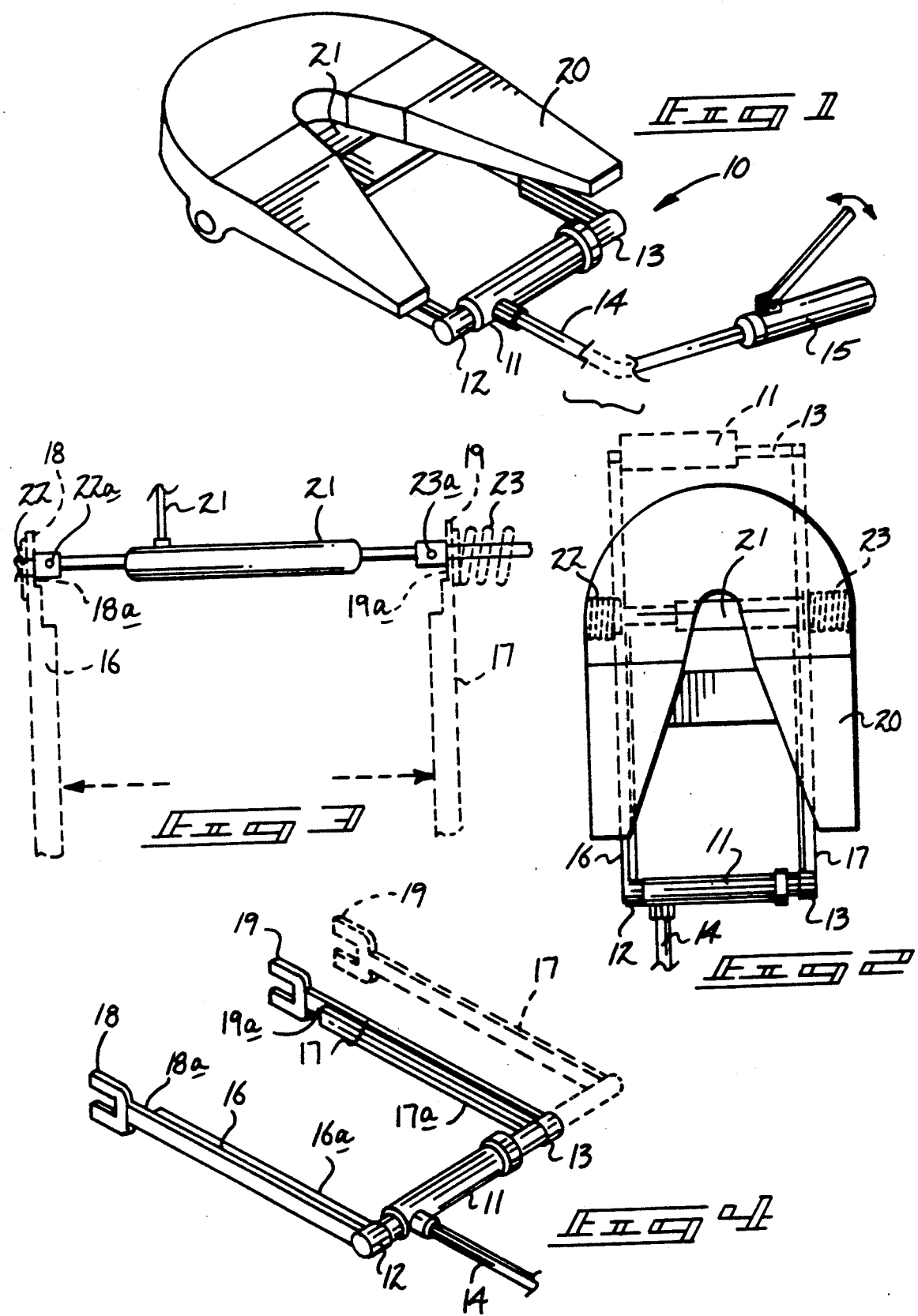

HOLLAND FIFTH WHEEL CYLINDER REMOVAL TOOL

BACKGROUND OF THE INVENTION

1. Field of the Invention

The field of invention relates to disassembly tools, and more particularly pertains to a new and improved Holland fifth wheel cylinder removal tool to enable compression of a plurality of spaced and aligned springs to enable removal of an intermediate pneumatic cylinder associated with the springs.

2. Description of the Prior Art

The use of disassembly tools is well known in the prior art. Heretofore, however, the prior art has failed to provide a convenient means of compressing, a plurality of spaced aligned springs associated with an intermediate pneumatic air cylinder of a fifth wheel mount. The typical manner of replacing the air cylinder has been the removal of the fifth wheel mount assembly to enable access to the underlying air cylinder, wherein the instant invention enables the associated springs to be retracted enabling removal of the associated connector pins to enable removal of the intermediately positioned pneumatic cylinder. An example of a prior art fifth wheel tool may be found in U.S. Pat. No. 4,251,089 to Skaggs wherein a de-coupling tool is utilized to de-couple a tractor from an associated tractor-trailer wherein the tool utilizes a levering mechanism for the de-coupling arrangement.

U.S. Pat. No. 3,014,697 to Goff sets forth a wedge-shaped tool utilizing a hook to extract objects intermediately of a plurality of tandem wheels utilizing the fulcruming of the lever for extraction of foreign objects between the aforenoted wheels.

U.S. Pat. No. 3,239,241 to Worden sets forth a lever extension for de-coupling of a locking king pin betwen the fifth wheel mount and an associated trailer.

U.S. Pat. No. 3,770,296 to Logan sets forth a king pin arrangement utilized with a fifth wheel mount typifying the association of the trailer to the mount.

U.S. Pat. No. 3,928,902 to Seims illustrates a levering tool for the removal of air valves from conventional automotive wheels.

As such, it may be appreciated that there is a continuing need for a new and improved Holland fifth wheel cylinder removal tool which addresses both the problems of ease of use and effectiveness in construction, and in this respect, the present invention substantially fulfills this need.

SUMMARY OF THE INVENTION

In view of the foregoing disadvantages inherent in the known types of removal tools now present in the prior art, the present invention provides a fifth wheel removal tool to enable directing of a plurality of spaced arms underlying a Holland fifth wheel mount to effect compressing of the associated pneumatic springs and enable removal of the intermediate pneumatic cylinder upon extension of the jaw arms of the tool. As such, the general purpose of the present invention, which will be described subsequently in greater detail, is to provide a new and improved fifth wheel cylinder removal tool which has all the advantages of the prior art removal tools and none of the disadvantages.

To attain this, the present invention comprises a fluid cylinder including a stub shaft extending exteriorly of a rear end thereof with a piston extensible and retractable relative to the cylinder with a plurality of spaced and aligned elongate arms extending orthogonally to the stub shaft and the piston respectively with a "U" shaped jaw integrally formed to each terminal end of the arm to enable extension and retraction of the arms relative to one another. The arms are of a length shorter than that of the legs of the bifurcated fifth wheel mount to enable the arms to be directed underlying the mount to gain access to the springs and the intermediate pneumatic cylinder.

My invention resides not only in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Futher, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Holland fifth wheel cylinder removal tool which has all the advantages of the prior art removal tools and none of the disadvantages.

It is another object of the present invention to provide a new and improved fifth wheel cylinder removal tool which may be easily and efficiently manufactured and marketed.

It is a further object of the present invention to provide a new and improved fifth wheel cylinder removal tool which is of a durable and reliable construction.

An even further object of the present invention is to provide a new and improved Holland fifth wheel cylinder removal tool which is susceptible of a low cost of manufacture with regard to both materials and labor, and which accordingly is then susceptible of low prices of sale to the consuming public, thereby making such Holland fifth wheel cylinder removal tools economically available to the buying public.

Still yet another object of the present invention is to provide a new and improved Holland fifth wheel cylinder removal tool which provides in the apparatuses and methods of the prior art some of the advantages thereof, while simultaneously overcoming some of the disadvantages normally associated therewith.

Still another object of the present invention is to provide a new and improved Holland fifth wheel cylinder removal tool wherein the same may be readily directed underlying a fifth wheel trailer mount to enable contraction of a plurality of spaced springs positioned on either side of an intermediate pneumatic cylinder to enable removal of the cylinder upon removal of joining connector pins associated between the cylinder and connecting members of the springs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention directed underlying a fifth wheel trailer mount.

FIG. 2 is an orthographic top view of the instant invention illustrating the arms in an extended position.

FIG. 3 is an isometric illustration of the tool of the instant invention.

FIG. 4 is an isometric illustration of the instant invention.

DESCRIPTION OF THE PREFERRED EMBODIMENT

With reference now to the drawings, and in particular to FIGS. 1 to 4 thereof, a new and improved "Holland" type fifth wheel cylinder removal tool embodying the principles and concepts of the present invention and generally designated by the reference numeral 10 will be described.

More specifically, the fifth wheel cylinder removal tool 10 essentially comprises an elongate fluid cylinder 11 of a first diameter with an exteriorly extending stub shaft 12 integrally formed to the fluid cylinder 11 of a second reduced diameter with an extensible and retractable piston 13 extending from within the cylinder remote from the stub shaft. A flexible hose 14 associates a manual pump 15 with the fluid cylinder 11 to effect extension and retraction of the piston relative to the cylinder. A first arm 16 extends orthogonally outwardly of the stub shaft 12 with a first reinforcing web 16a directed along an interior surface of the first arm 16 and integrally secured to the first arm and to the stub shaft to effect rigidity to the first arm. Similarly, a second arm 17 is orthogonally and fixedly secured to the piston 13 with a second reinforcing web 17a fixedly formed to an interior surface of the second arm and to the piston. The reinforcing webs 16a and 17a extend along the length of the first and second arms 16 and 17 a distance not to exceed half of the length of the arms and are preferably directed substantially one third of the distance along the interior surface of each arm to effect rigidity to the arms, yet enabling the forwardmost portions of the arms to be in a lesser width to enhance visibility of the operation of the arms and enable the arms to be directed between associated springs on the pneumatic cylinder 21 for contraction of the springs. Spcifically, the "U" shaped jaws 18 and 19 are formed to provide clearance reliefs 18a and 19a respectively relative to the reinforcing webs and arms 16 and 17 to enhance access to the air cylinder 21 underlying the fifth wheel mount 20. Integrally formed to each end of the first and second arms 16 and 17 respectively are a first and second "U" shaped jaw 18 and 19. The "U" shaped jaws are aligned with the respective arms and are integrally secured to the arms medially of the "U" shaped jaws to align the openings of the "U" shaped jaws with the arms end in a direction opposed to that of the arms 16 and 17 respectively. The arms are of a lesser length than that of the legs of a bifurcated fifth wheel mount 20 to enable access to an underlying air cylinder 21 that is maintained in position between a plurality of spaced springs, including a first spring 22 and a second spring 23, wherein the air cylinder 21 is joined to spring mounts by associated removal pins comprising a connector pin 22a and a connector pin 23a. Upon the compression of the springs, as illustrated in FIG. 2, access to the associated pins 22a and 23a is available as well as eliminating pressure upon the connector to effect removal of the pins and subsequently of the cylinder. Replacement of the pneumatic cylinder 21 merely requires a compression of the springs and a replacement of the pins 22a and 23a upon positioning of the cylinder in appropriate orientation relative to the springs and mounts.

It should be noted per the phantom illustration of FIG. 2 that the tool 10 may gain access to the cylinder 21 either forwardly or rearwardly of the fifth wheel mount 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials shape, form, function and manner of operation, assembly and use, are deemed readily apparent and obvious to one skilled in the .rt, and all equivalent relationships to those illustrated in the drawings and described in the specification are intended to the encompased by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer mount cylinder removal tool for use in combination with a bifurcated trailer mount including a plurality of legs of a predetermined length, said trailer mount including an underlying mount cylinder positioned between aligned first and second springs, said tool comprising,
   a fluid cylinder including an extensible and retractable piston telescopingly received within said cylinder, and a fluid pump including an elongate flexible hose operably associating said pump to said cylinder, and a first arm integrally secured to said cylinder at a rear terminal end of the first arm, and a second arm integrally secured to said piston at a rear terminal end of the second arm, and said first and second arms including a respective first and second jaw fixedly mounted to a forward terminal end of each arm wherein said jaws are positioned adjacent to and between the first and second springs to compress each spring when said piston is extended from a first retracted position to a second extended position, and wherein said fluid cylinder is of a first diameter and is integrally formed in axial alignment with a stub shaft and wherein said first arm is integrally and orthogonally secured to said stub shaft, and said second arm is intergrally and orthogonally secured to said piston, and wherein said first and second arms are of a lesser length than the predetermined length of said bifurcated trailer mount to enable access of said legs to the mount cylinder underlying the bifurcated mount to enable access either forwardly or rearwardly of the wheel mount to the mount cylinder, and wherein said first arm includes a first reinforcing web, and said second arm includes a second reinforcing web wherein said reinforcing webs are integrally secured to each respective arm and to the respective stub shaft and the respective piston to provide rigidity to the respective first and second arms, and the first reinforcing web and the second reinforcing web are of a length less than half of the arm length defined by each arm, and wherein each respective first and second jaw is of a "U" shape, and each respective first and second arm is integrally secured medially of respective first and second leg portions of each U-shaped jaw, and wherein the first arm is of an arm length equal to an arm length defined by the second arm, and the first arm and the second arm are parallel to each other, and each first and second jaw are of a reduced thickness relative to the respective first and second arm to define a respective first and second relief surface, the first and second relief surface in a confronting relationship relative to each other.

* * * * *